Fig. 1

Inventor:
Rudolf Meyer

Inventor:
Rudolf Meyer

United States Patent Office 3,564,679
Patented Feb. 23, 1971

3,564,679
METHOD AND MEANS FOR PRODUCING AN UMBRELLA FRAME OF PLASTIC MATERIAL
Rudolf Meyer, Chiemseestrasse 42,
Gstadt am Chiemsee, Germany
Filed Feb. 13, 1968, Ser. No. 705,093
Claims priority, application Germany, Feb. 15, 1967,
B 91,191
Int. Cl. B21f 41/00
U.S. Cl. 29—25                                     8 Claims

ABSTRACT OF THE DISCLOSURE

A method for producing an umbrella frame of injection-molded plastic material comprising a crown, a stick, a slider with roof ribs connected to struts, the ribs and struts being attached to the stick and slider respectively.

---

My invention relates to method and means for producing an umbrella frame of plastic material and more particularly for producing such a frame of injection-molded plastic material.

Umbrella frames have heretofore been known to be made of plastic material as exemplified in German published applications 1,229,685 and 1,230,529.

The umbrella frame which includes an umbrella stick, roof-supporting ribs and struts as well as an umbrella crown and slider present a rather complex structure in appearance. This complexity is caused by the fact that the roof-supporting ribs are all disposed in one conical configuration, and the struts are disposed in a different conical configuration which has an axis in common with that of the first-mentioned conical configuration, and coinciding with the axis of the umbrella stick. An injection mold of unusually complex construction is therefore required for the injection molding of roof-supporting ribs and struts with umbrella crown and slider all in one piece, and the construction of the mold is even more complex if the umbrella stick is to be produced therewith in the same injection-molding operation. In order to work with an injection mold of reduced complexity, injection molding of umbrella crown, roof-supporting ribs, struts and slider in one piece has generally been avoided. Instead, at least one of the three flexible joints respectively connecting the crown with each roof-supporting rib, the roof-supporting rib with the strut associated therewith, and each strut with the umbrella slider, is separately produced after the injection molding proces has been completed, by assembling the frame, for example with a pivot pin or ball-and-socket joint. If assembly of the frame at one or more joints is required, however, the advantage to be gained by injection molding of the umbrella frame from plastic material, namely the reduction of subsequent assembly work to a minimum, is partly lost.

It is accordingly an object of my invention to provide method and means for producing a umbrella frame of plastic material whereby the umbrella crown, the slider, the roof-supporting ribs and the struts are injection molded in one piece.

It is a further object of my invention to provide injection mold of relatively simple construction for use with my method, and more particularly one that consists of only a relatively small number of component parts.

My invention is based on the idea that if one were to slice through both the umbrella crown and the umbrella slider along a line on the outer surface thereof extending substantially parallel to the axis thereof, and if both the crown and the slider were then spread or flattened out into a plane, the resulting structure would have a relatively simple shape. The conical configuration of the roof-supporting ribs and the struts of the conventional frame would thereby disappear. All of the roof-supporting ribs would then extend parallel to one another in a single plane in which the flattened-out crown is also disposed as a cross-piece. Similarly, the struts and the expanded slider would then all be disposed in a single plane, the struts being located parallel to one another and the slider extending as a cross-piece thereto. The plane in which the struts and the slider are disposed would, of course, be inclined with respect to the plane in which the roof-supporting ribs and the expanded umbrella crown are disposed.

With this basic idea in mind, I provide in accordance with my invention a method of injection-molding a frame in an injection mold so that the roof-supporting ribs all extend parallel to one another in a first plane, one end respectively thereof being connected by a first flat strip or cross-piece extending transversely thereto, and the struts are all located parallel to one another in a second plane inclined with respect to the first plane, one end respectively of each of the struts being connected to a corresponding roof-supporting rib and the other end of the respective struts being connected to a second flat strip or cross-piece extending transversely thereto. After the injection molding operation, the first strip or cross-piece is formed into a ring and the ends thereof secured together to provide the crown for the umbrella, and the second strip is formed into a ring and the end thereof secured together so as to provide the slider for the umbrella.

In accordance with my invention I also provide means for carrying out the foregoing method comprising an injection mold formed with a first plurality of mold cavities extending parallel to one another in a common first plane for producing a plurality of roof-supporting ribs, a mold cavity extending transversely to and communicating with one end of the first plurality of cavities for forming a first flat strip integral with the roof-supporting ribs, a corresponding second plurality of mold cavities extending parallel to one another in a common second plane inclined with respect to said first plane for producing a plurality of struts, the second plurality of cavities communicating at one end thereof with the first plurality of cavities, respectively, so that the plurality of struts produced are integral with the ribs, and a mold cavity extending transversely to and communicating with the second plurality of cavities at the other end thereof for producing a second flat strip integral with the struts.

In accordance with a further feature of my invention, the umbrella stick is formed at the same time that the crown, slider, roof-supporting ribs and struts are injection molded, the umbrella stick being either formed entirely of plastic material or of a stiffening member such as a metal rod encased by plastic material. Further in accordance with my invention, therefore, I provide an injection mold with a suitable recess for forming the umbrella stick which is located tangentially to the surface of the first strip so that when the injection molding operation takes place, the stick or the plastic casing thereof is formed integrally with the first strip. At the completion of the injection molding operation, the first strip is bent completely around the stick to form the crown of the umbrella frame.

The connection formed between the first strip and the umbrella stick by the injection molding process can have two forms in accordance with my invention. Thus, the injection mold can be so constructed that the resulting one-piece frame will have an umbrella stick that is connected substantially to the center of the first strip so that after the injection molding operation is completed, both halves of the strip are wound around the stick. The mold can also be so constructed that the umbrella stick is connected to the first strip at an end thereof. The injection mold employed for producing the last-mentioned form of the frame is simpler than the first-mentioned mold, while the first-mentioned mold provides specific advantages with regard to the processing of the frames to be effected after the frames are injection molded.

Other features which are considered as characteristic for the invention are set forth in the appended claims.

Although the invention is illustrated and described herein as method and means for producing an umbrella frame of plastic material, it is nevertheless not intended to be limited to the details shown, since various modifications may be made therein without departing from the spirit of the invention and within the scope and range of equivalents of the claims.

The construction and method of operation of the invention, however, together with additional objects and advantages thereof will be best understood from the following description when read in connection with the accompanying drawings, in which.

Figure 1:
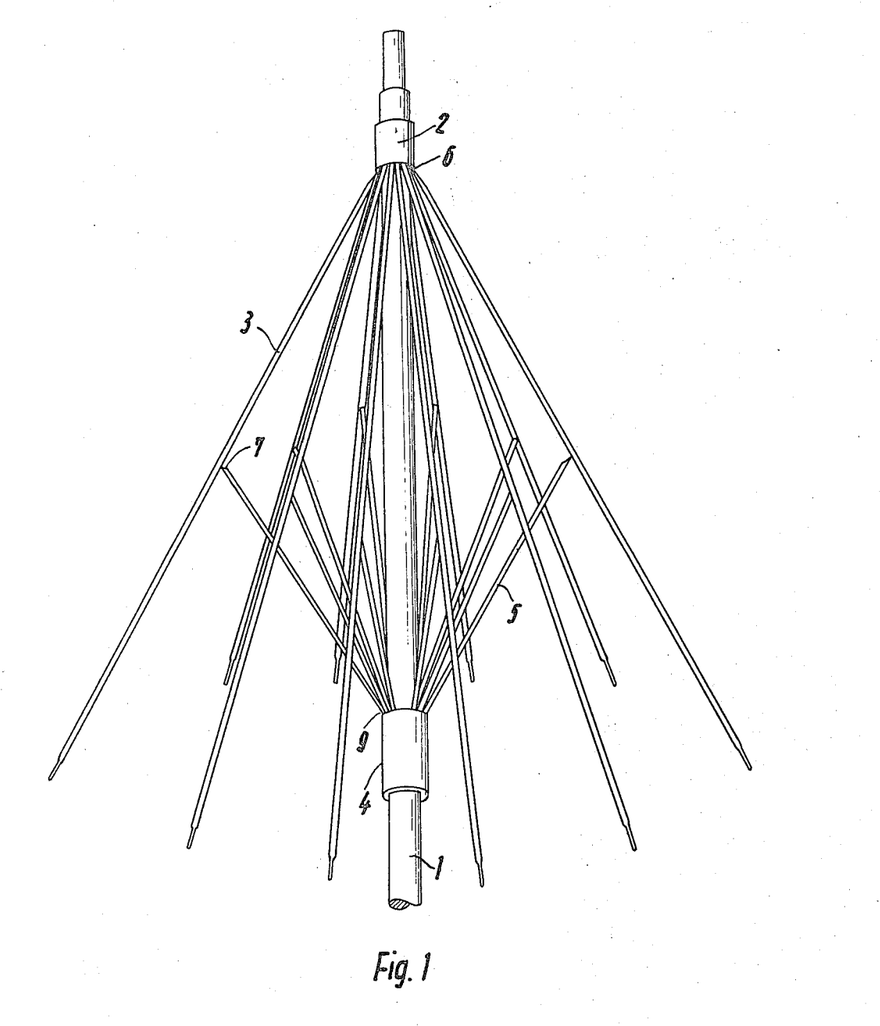
FIG. 1 is a perspective view of an umbrella frame constructed by the method and means of the invention in this application.

Referring now to the drawings and first particularly to FIG. 1 thereof, there is shown the finished product produced from a frame blank molded in an injection molding operation according to my invention, which certainly underscores the complex construction of the product and which leads one to surmise that a complex injection mold consisting of a large number of parts is required in order to form this product of plastic material by injection molding.

Figure 2:
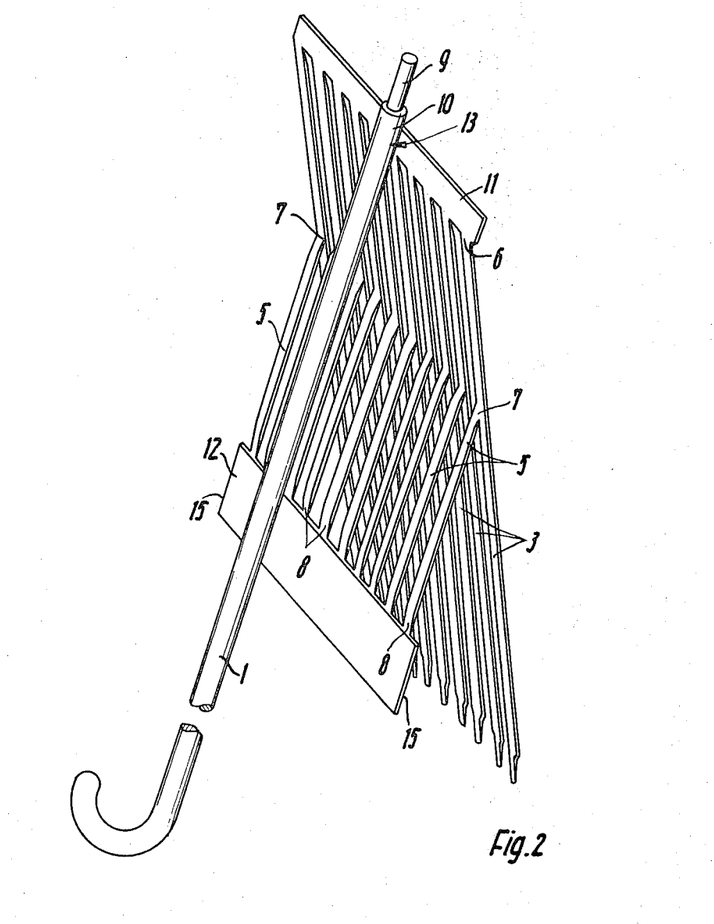
FIG. 2 is a perspective view of one embodiment of an umbrella frame blank produced in accordance with one mode of the method and one embodiment of the means for carrying out the method of the invention.

As shown in FIG. 1, the finished product is an umbrella frame having an umbrella stick 1 and an umbrella crown 2. As shown in the embodiment of FIG. 1, ten roof-supporting ribs 3, for example, are flexibly or hingedly connected to the crown 2. A slider 4 is displaceably mounted on the stick 1 and a plurality of struts 5 are flexibly or hingedly connected at one end thereof respectively to the slider 4 and at the other end thereof respectively to the corresponding roof-supporting ribs 3 respectively. All of the parts shown in FIG. 2 are formed of plastic material such as polyvinyl, polystyrene, polyethylene, or the like materials, and are formed together in one piece, except perhaps for the umbrella stick. The cross-sectional dimensions of the frame parts are such that they possess the stiffness required by an umbrella frame when subjected to the stresses of the umbrella covering or roofing material subsequently attached thereto. At the hinge locations 6, 7 and 8, the frame portions are reduced in cross section so that they have the necessary flexibility or bendability. For greater detail as to how the frame members can be individually shaped to accomplish this purpose, reference can be had to the aforementioned published German applications.

Figure 3:
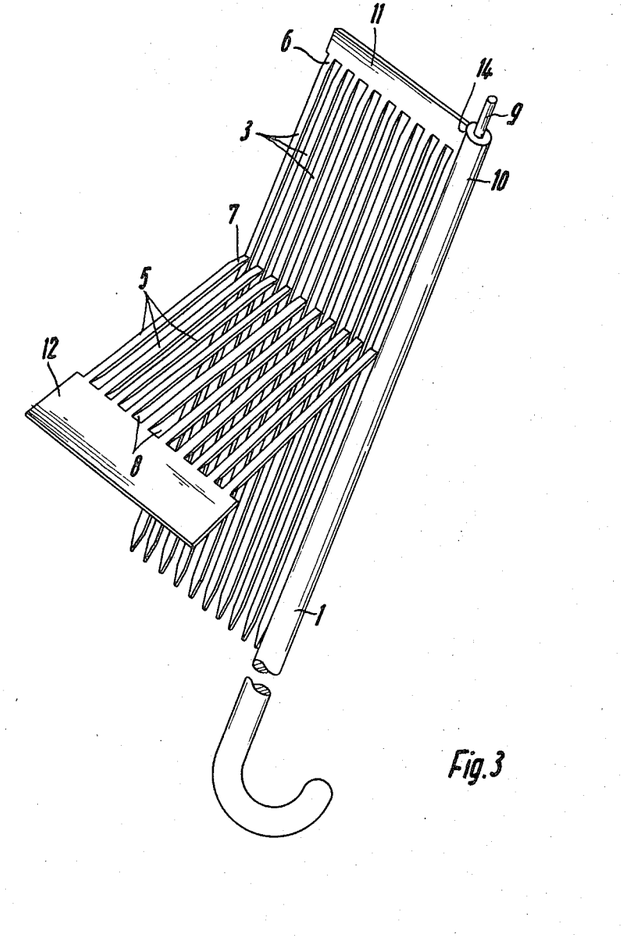
FIG. 3 is a perspective view corresponding substantially to that of FIG. 2 of another umbrella frame blank produced in accordance with a second mode of the method and embodiment of the means of the invention.

The injection mold according to my invention cannot be used for producing the umbrella frame as shown in FIG. 1 directly therefrom. Rather, the frame produced by injection molding is in the form of a blank such as is shown in FIGS. 2 and 3. In both of the embodiments shown in FIGS. 2 and 3, the umbrella stick 1 is formed of a stiffening or reenforcing metal rod 9 surrounded by a tubular layer 10 of plastic material such as polyvinyl, polyethylene or the like material. The surrounding plastic layer or casing 10 of the stick 1, when formed in an injection molding process by employing the hereinafter described injection mold, is integral with a strip 11 of similar plastic material formed therewith in the same injection molding operation. Roof-supporting ribs 3 formed simultaneously in the injection mold extend from the strip 11 in the condition illustrated in FIGS. 2 and 3 in a direction parallel to one another and are disposed in a single plane. All of the struts 5 are also injection-molded in the same mold simultaneously with the roof-supporting ribs, and all extend parallel to one another and are disposed in another common plane; however, the plane in which the struts 5 are disposed is inclined with respect to the plane in which the roof-supporting ribs 3 are disposed. As shown in FIG. 2, the plane in which the struts 5 are disposed is parallel to the axis of the stick 1. On the other hand, as shown in FIG. 3, the plane in which the roof-supporting ribs 3 are disposed is parallel to the axis of the stick 1. The injection mold is furthermore provided with a recess for molding a strip 12 which connects all the free ends of the struts 5 to one another and is disposed in the same plane in which the struts 5 are disposed. The injection mold is constructed in such a manner that, at the locations 6, 7 and 8 of the frame blank shown in FIGS. 2 and 3, the cross section of the roof-supporting ribs 3 and of the struts 5 is so greatly reduced or is shaped simply in the form of a thin flap so as to provide the hinged or flexible connection between the individual components of the frame blank.

In the embodiment shown in FIG. 2, the strip 11 is formed integral with the plastic casing 10 of the stick 1 substantially at the middle 13 of the strip 11 by the injection molding operation. The embodiment shown in FIG. 3 differs from that of FIG. 2 in that the strip 11 is integrally joined with the plastic casing 10 of the stick 1 at an end 14 of the strip 1 by the injection molding operation. In all other respects, the embodiments of FIGS. 2 and 3 are substantially the same.

The frame blank of FIG. 2 removed from the injection mold is transformed into a complete or final umbrella frame according to FIG. 1 by transforming the strips 11 and 12 respectively into the umbrella crown 2 and the umbrella slider 4. Thus, the strip 11 is bent around the outer surface of the plastic casing of the umbrella stick 1 and is secured thereto by a suitable adhesive while strip 12 is bent in a similar manner into a cylindrical or sleeve-shaped member slidably surrounding the stick 1 so as to form the umbrella slider 4, the abutting ends 15 of the strip 12 being secured to one another similarly by a suitable adhesive. The length of the strip 12 is suitably selected to be slightly greater than the length of the strip 11 so that the umbrella slider produced from the strip 12 has sufficient clearance for sliding along the stick 1. Both strips 11 and 12 can have the same length, however, if the diameter of the stick 1 is suitably reduced to accommodate sliding of the slider 4 produced from the strip 12.

Of the two illustrated frame blank embodiments, that of the frame blank shown in FIG. 3 affords the greater advantage generally because the injection mold required for producing the embodiment of FIG. 3 is somewhat simpler than that required for producing the embodiment of FIG. 2. However, the embodiment of the frame blank shown in FIG. 2 has the advantage over that of FIG. 3 in that the bending of the strips 11 and 12 about the stick 1 in the final step of the method of my invention is somewhat easier therefore than the embodiment of FIG. 3.

Figure 4:
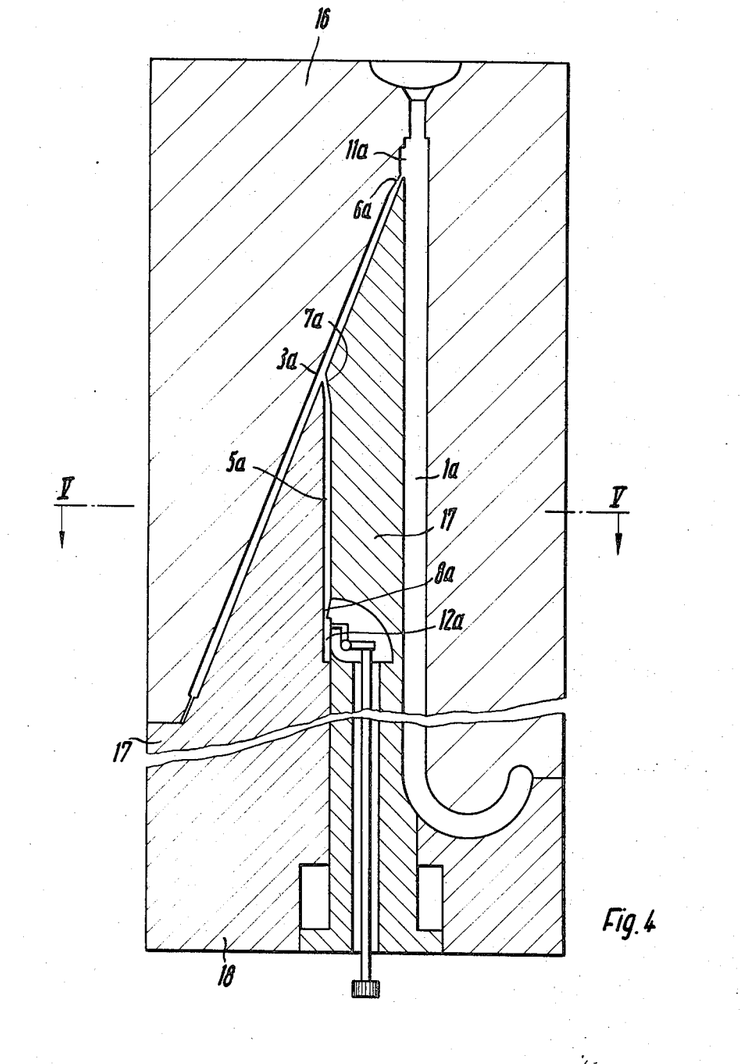
FIG. 4 is a longitudinal sectional view of an injection mold for producing the frame blank of FIG. 2.
Figure 5:
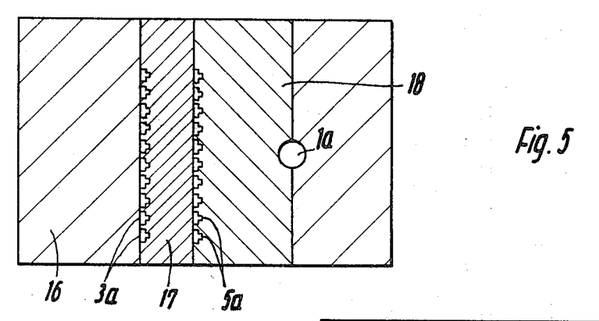
FIG. 5 is a cross-sectional view taken along the line V—V of FIG. 4.
Figure 6:
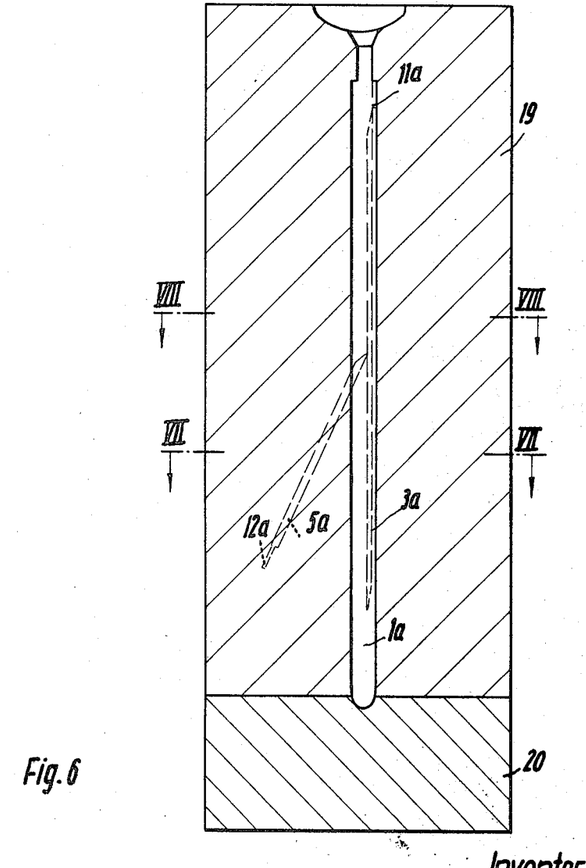
FIG. 6 is a longitudinal sectional view of an injection mold for producing the frame blank of FIG. 3 taken along the line VI—VI in FIG. 7.
Figure 7:
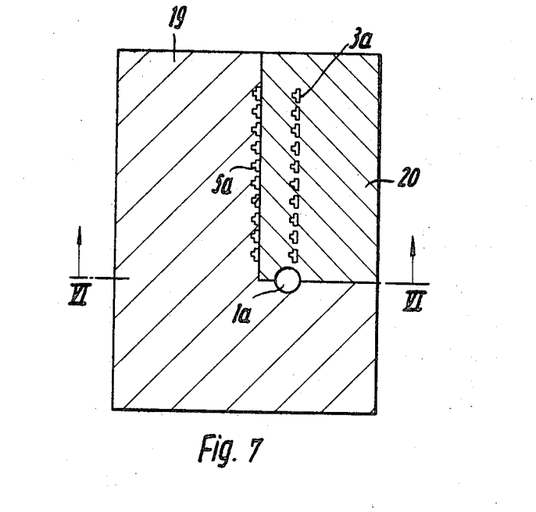
FIG. 7 is a cross-sectional view taken along the line VII—VII in FIG. 6.
Figure 8:
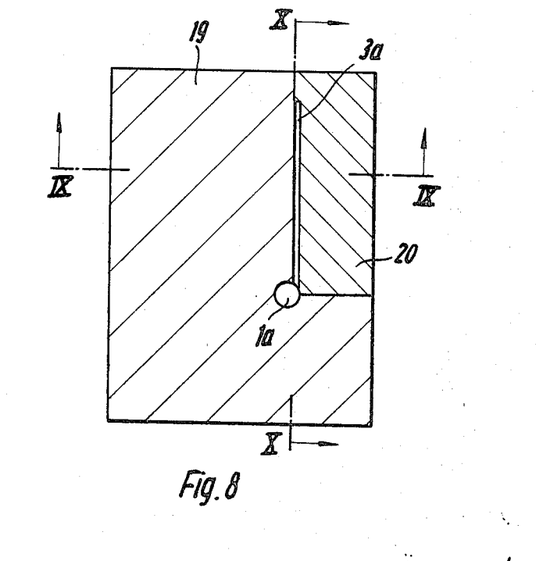
FIG. 8 is a cross-sectional view taken along the line VIII—VIII in FIG. 6.
Figure 9:
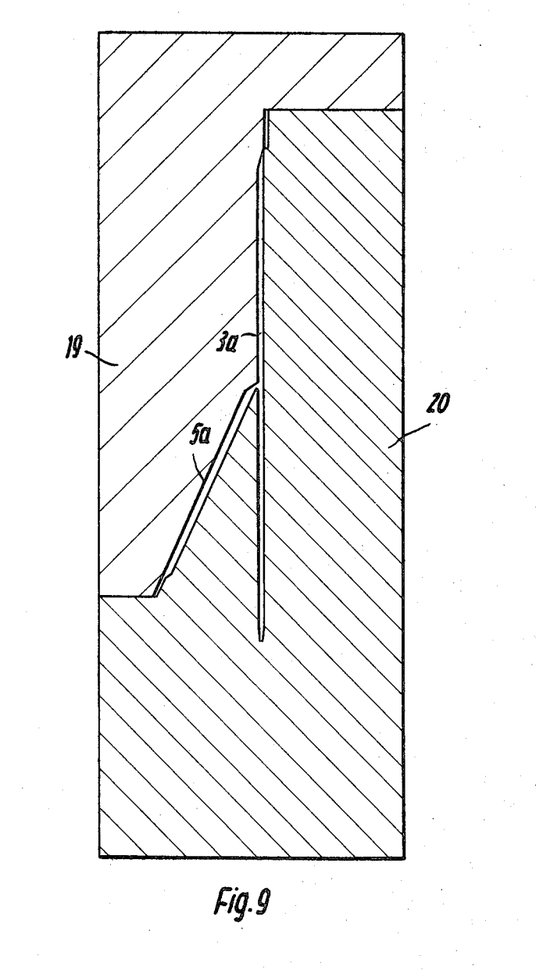
FIG. 9 is a longitudinal sectional view taken along the line IX—IX in FIG. 8.
Figure 10:
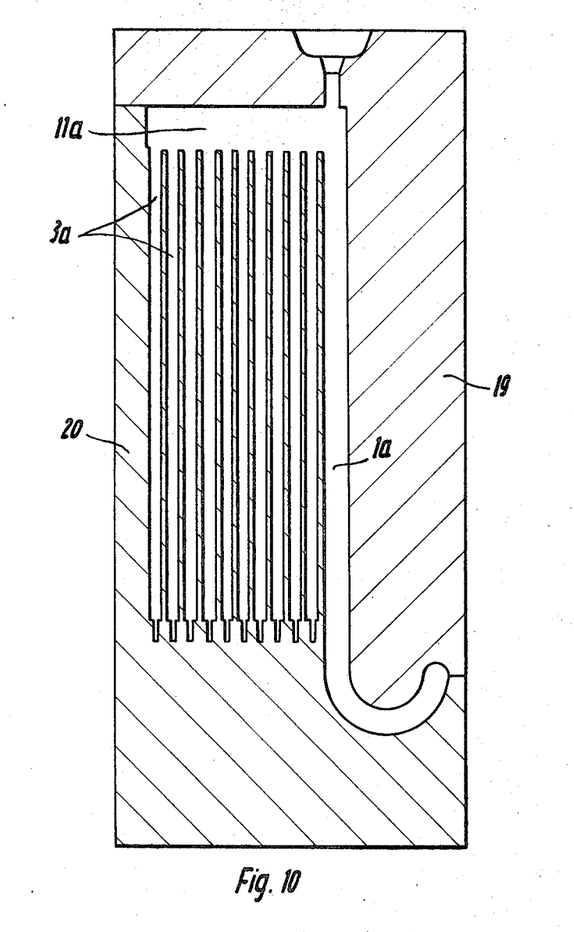
FIG. 10 is a longitudinal sectional view taken along the line X—X in FIG. 8.

The longitudinal section of FIG. 4 and the transverse section of FIG. 5 through an injection mold for producing the frame blank of FIG. 2 has the necessary forming recesses or mold cavities 1a for the umbrella stick, 3a for the roof-supporting ribs, 5a for the struts, 11a for the first strip forming the umbrella crown 2, and 12a for the second strip forming the umbrella slider 4. At the locations 6a, 7a and 8a, the injection mold is provided with suitably narrowed recess portions which will reduce the cross section of the molded part at those locations so as to provide the necessary flexibility or bendability to the frame members thereat. The illustrated injection mold, which can also have other possible constructions, is formed of a number of component parts which are joined together before injection with liquid plastic material in accordance with conventional injection molding techniques, and after injection of the plastic and solidification thereof are again separated from one another so that a frame blank such as is shown in FIG. 2 is formed thereby. These component parts of the injection mold, insofar as they are shown in the drawings, are identified by the reference numerals 15 through 18.

To produce the frame blank shown in FIG. 3, an injection mold of substantially simpler construction than that necessary for producing the frame blank of FIG. 2 can be used. Under certain conditions, it is possible in this case to employ an injection mold consisting of only two main parts 19 and 20, as shown in FIGS. 6 through 10. Minor auxiliary component parts of the mold are not illustrated in FIGS. 6 to 10. The recesses or hollow spaces in the injection mold shown in FIGS. 6 to 10 which correspond to the individual parts of the umbrella frame, are identified by the same reference characters in FIGS. 6 to 10 as those employed in FIG. 4.

Figure 11:
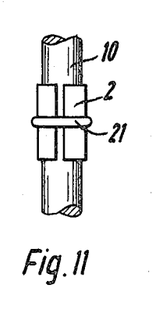
FIG. 11 is a fragmentary longitudinal view of FIG. 1 showing a modification for ensuring the connection of the umbrella crown to the umbrella stick.
Figure 12:
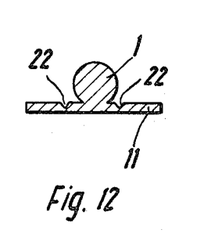
FIGS. 12 and 13 are cross-sectional views of the stick and crown strip shown in FIGS. 2 and 3 respectively, and further showing details of the construction of the crown strip.
Figure 13:
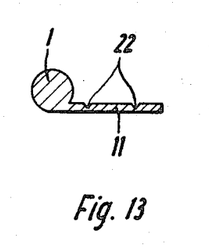

Since the axial forces between the umbrella crown and the umbrella stick can take on very large values due to the effect of the fabric covering of the umbrella and of the toggle action of the umbrella frame linkages, a simple adhesive connection between the umbrella crown 2 produced from the strip 11 and the plastic casing 10 of the stick 1 can prove to be insufficient. This deficiency can be remedied in the manner shown in FIG. 11 by applying a simple clamping clip 21 of steel wire, for example, to span or encircle the strip 11 that has been bent into the form of a ring which is not quite entirely closed to provide the umbrella crown 2. If in accordance with the preferred embodiment of the invention, the strip 11 is integrally joined by the injection molding process with the stick 1, formed either entirely of plastic material or of a metal rod encased with plastic material, as shown in FIGS. 12 and 13, it is then recommended to provide the strip 11 with suitable notches 22 to facilitate the bending thereof around the stick 1 in order to form the crown 2 as shown in FIG. 1. Corresponding notches can also be provided in the strip 12 to facilitate the bending thereof into the slider 4 of FIG. 1.

I claim:

1. Method for producing an umbrella frame having a stick, a crown mounted on the stick, a plurality of roof-supporting ribs connected to the crown, a corresponding plurality of struts connected respectively to the ribs and a slider slidably mounted on the stick and connected to the plurality of struts which comprises injection-molding in one operation and in two mold cavities a one-piece frame blank of plastic material comprising, in a first mold cavity, a plurality of roof-supportings ribs extending parallel to one another in a common first plane and integral with a first flat flexible strip extending transversely thereto at one end thereof, and in a second mold cavity, a corresponding plurality of struts extending parallel to one another in a common second plane disposed in inclined relationship to the first plane, the struts being hingedly connected at one end thereof with the roof-supporting ribs, substantially in the center of the ribs, and at the other end thereof with a second flat flexible strip extending transversely to the struts, the first and second planes intersecting at a line along which the struts are connected to the ribs, and bending the first flat strip and the second flat strip around an umbrella stick and welding the abutting edges of the strips together for respectively forming the crown and slider of the umbrella frame, and disposing the roof-supporting ribs and the struts respectively in conical configuration substantially coaxial with the stick.

2. Method according to claim 1 which includes molding the umbrella stick of the same plastic material integral with the first flat strip simultaneously therewith in the same injection molding operation.

3. Method according to claim 1 which includes molding a tubular member forming part of the umbrella stick of the same plastic material integral with the first flat strip simultaneously therewith in the same injection molding operation.

4. Method according to claim 1 which includes simultaneously molding at least part of the umbrella stick of the same plastic material integral with the first flat strip at a location substantially in the center of the first flat strip in the same injection molding operation.

5. Method according to claim 1 which includes simultaneously molding at least part of the umbrella stick of the same plastic material integral with the first flap strip at one end of the first flat strip in the same injection molding operation.

6. Method according to claim 1 which includes forming notches in one surface of at least one of the flat strips to improve the bendability of the strip.

7. Method according to claim 1 which includes securing the bent first flat strip to the stick with adhesive.

8. Method according to claim 1 which includes securing the bent first flat strip to the stick with a clamping ring.

References Cited

UNITED STATES PATENTS

| 2,621,669 | 12/1952 | Mayer | 135—20 |
| 2,640,490 | 6/1953 | Kramer | 135—20 |
| 3,177,883 | 4/1965 | Militano | 135—20 |

JOHN F. CAMPBELL, Primary Examiner

R. J. CRAIG, Assistant Examiner

U.S. Cl. X.R.

29—527; 135—20